(12) United States Patent
Park et al.

(10) Patent No.: US 11,067,877 B2
(45) Date of Patent: Jul. 20, 2021

(54) STRUCTURED LIGHT PROJECTOR AND ELECTRONIC DEVICE INCLUDING THE SAME

(71) Applicant: SAMSUNG ELECTRONICS CO., LTD., Suwon-si (KR)

(72) Inventors: Hyeonsoo Park, Suwon-si (KR); Seunghoon Han, Seoul (KR); Minkyung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/441,559

(22) Filed: Jun. 14, 2019

(65) Prior Publication Data

US 2020/0150518 A1    May 14, 2020

Related U.S. Application Data

(60) Provisional application No. 62/758,064, filed on Nov. 9, 2018.

(30) Foreign Application Priority Data

Feb. 15, 2019    (KR) .......................... 10-2019-0017960

(51) Int. Cl.
*G03B 21/20*    (2006.01)
*H04N 9/31*    (2006.01)

(52) U.S. Cl.
CPC ....... *G03B 21/2013* (2013.01); *H04N 9/3152* (2013.01)

(58) Field of Classification Search
CPC .............. G03B 21/2013; H04N 9/3152; G02B 6/0229; G02B 27/147
See application file for complete search history.

(56) References Cited

U.S. PATENT DOCUMENTS 9,273,846 B1    3/2016    Rossi et al.
2007/0273957 A1*   11/2007    Zalevsky ........... G02B 27/1093
                                                        359/326

(Continued)

FOREIGN PATENT DOCUMENTS

EP          3226042 A1     10/2017
JP       2017-157488 A      9/2017

(Continued)

OTHER PUBLICATIONS

Bohan Lyu et al., "Infrared structure light projector design for 3D sensing", Proc. of SPIE vol. 10690, Optical Design and Engineering VII, Jun. 5, 2018 (9 pages total).

(Continued)

*Primary Examiner* — Michelle M Iacoletti
*Assistant Examiner* — Magda Cruz
(74) *Attorney, Agent, or Firm* — Sughrue Mion, PLLC

(57) ABSTRACT

Provided is a structured light projector including a light source configured to emit light, and a nanostructure array configured to form a dot pattern based on the light emitted by the light source, the nanostructure array including a plurality of super cells each respectively including a plurality of nanostructures, wherein each of the plurality of super cells includes a first sub cell that includes a plurality of first nanostructures having a first shape distribution and a second sub cell that includes a plurality of second nanostructures having a second shape distribution.

26 Claims, 14 Drawing Sheets

(56) References Cited

U.S. PATENT DOCUMENTS

| | | | |
|---|---|---|---|
| 2016/0004090 A1* | 1/2016 | Popovich | G02B 6/0028 |
| | | | 359/316 |
| 2017/0023803 A1* | 1/2017 | Han | G02F 1/0102 |
| 2017/0287151 A1* | 10/2017 | Han | G06T 7/248 |
| 2018/0106606 A1 | 4/2018 | Fujita et al. | |
| 2018/0322645 A1* | 11/2018 | Han | G01B 11/2513 |
| 2019/0034035 A1* | 1/2019 | Han | G03B 21/001 |
| 2019/0049097 A1* | 2/2019 | Rossi | G02B 27/20 |
| 2019/0049235 A1* | 2/2019 | Han | G02B 27/425 |
| 2019/0057512 A1* | 2/2019 | Han | G02B 1/118 |
| 2019/0058871 A1* | 2/2019 | Han | G01B 11/2513 |
| 2019/0137665 A1* | 5/2019 | You | G02B 5/1809 |
| 2019/0137856 A1* | 5/2019 | Na | G01B 11/2522 |

FOREIGN PATENT DOCUMENTS

| | | |
|---|---|---|
| JP | 6355844 B2 | 7/2018 |
| WO | 2017069705 A1 | 4/2017 |
| WO | 2017131585 A1 | 8/2017 |

OTHER PUBLICATIONS

Communication dated Mar. 10, 2020 issued by the European Patent Office in European Application No. 19188909.6.

* cited by examiner

STRUCTURED LIGHT PROJECTOR AND ELECTRONIC DEVICE INCLUDING THE SAME

CROSS-REFERENCE TO RELATED APPLICATIONS

This application is based on and claims the benefit of U.S. Provisional Patent Application No. 62/758,064, filed on Nov. 9, 2018 in the United States Patent and Trademark Office, and claims priority from Korean Patent Application No. 10-2019-0017960, filed on Feb. 15, 2019, in the Korean Intellectual Property Office, the disclosures of which are incorporated herein by reference in their entireties.

BACKGROUND

1. Field

Example embodiments of the present disclosure relate to a structured light projector and an electronic device including the same.

2. Description of the Related Art

Recently, in relation to recognition of an object such as a human, things, etc., the need to accurately identify a shape, a position, movement, etc., of the object has increased for precise three-dimensional (3D) shape recognition. As a method to increase accuracy of 3D shape recognition, a 3D sensing technique using structured light has been developed, enabling a more precise motion recognition.

A structured light system has to be capable of forming a required dot pattern, and also, to be coupled with various electronic devices, miniaturization and high resolution of the structured light system are required. To produce structured light, an optical part such as a diffractive optical element (DOE) may be used. However, a volume of the optical part affects design precision and manufacturing requirements.

SUMMARY

One or more example embodiments provide a structured light projector and an electronic device including the same.

Additional aspects will be set forth in part in the description which follows and, in part, will be apparent from the description, or may be learned by practice of example embodiments.

According to an aspect of an example embodiment, there is provided a structured light projector including a light source configured to emit light, and a nanostructure array configured to form a dot pattern based on the light emitted by the light source, the nanostructure array including a plurality of super cells each respectively including a plurality of nanostructures, wherein each of the plurality of super cells includes a first sub cell that includes a plurality of first nanostructures having a first shape distribution and a second sub cell that includes a plurality of second nanostructures having a second shape distribution.

The light source may include a plurality of light-emitting elements.

The plurality of light-emitting elements and the plurality of super cells may be provided in two-dimensional periodic lattices, respectively.

A ratio of a lattice constant of the plurality of light-emitting elements to a lattice constant of the plurality of super cells may be a rational number.

The two-dimensional periodic lattices of the plurality of light-emitting elements and the two-dimensional periodic lattices of the plurality of super cells may have a same shape and different sizes.

The two-dimensional periodic lattices of the plurality of light-emitting elements and the two-dimensional periodic lattices of the plurality of super cells may have a same shape and a same size.

A distance between the light source and the nanostructure array may be an integer multiple of $C^2/2\lambda$, in which a lattice constant of the super cell is $C$ and a central wavelength of the light emitted by the light source is $\lambda$.

The first shape distribution and the second shape distribution may be different from each other.

The first sub cell and the second sub cell may have equal areas.

The super cell may further include k sub cells respectively including a $k^{th}$ nanostructure provided with a $k^{th}$ shape distribution, in which k is an integer between 3 and N and N is an integer greater than 3.

The first through $N^{th}$ sub cells included in the super cell may be provided in a two dimensional periodic lattice.

Each of the first through $N^{th}$ sub cells included in the super cell may have an area corresponding to an equally divided area of the super cell.

First through $N^{th}$ shape distributions of a plurality of first nanostructures through a plurality of $N^{th}$ nanostructures included in each of the first through $N^{th}$ sub cells may be different from each other.

Phase profiles of the first through $N^{th}$ sub cells may be associated with each other based on a predetermined rule, and each of the first through $N^{th}$ sub cells may be configured to modulate a phase of incident light based on the phase profiles of the first through $N^{th}$ sub cells, respectively.

A phase profile for an $m^{th}$ sub cell may include a local phase profile that is common to the first through $N^{th}$ sub cells and a global phase profile corresponding to a position of the super cell in which the $m^{th}$ sub cell is included, in which m is an integer from 1 to N and N is an integer greater than or equal to 3.

The first nanostructure and the second nanostructure, respectively, may have shape dimensions that are less than a wavelength of the light emitted by the light source.

A pitch of the plurality of first nanostructures and a pitch of the plurality of second nanostructures, respectively, may be less than or equal to ½ of the wavelength of the light emitted by the light source.

A height of each first nanostructure and a height of each second nanostructure, respectively, may be less than or equal to ⅔ of the wavelength of the light emitted from the light source.

The first nanostructure and the second nanostructure, respectively, may include a material having a refractive index that is different from a refractive index of a surrounding material by 0.5 or more.

The dot pattern may include a random pattern, and the random pattern may include a plurality of dots forming a cluster, the cluster being regularly provided.

According to another aspect of an example embodiment, there is provided an electronic device including a structured light projector including a light source configured to emit light, and a nanostructure array configured to form a dot pattern based on the light emitted by the light source, the nanostructure array including a plurality of super cells each respectively including a plurality of nanostructures, wherein each of the plurality of super cells includes a first sub cell that includes a plurality of first nanostructures having a first shape distribution and a second sub cell that includes a plurality of second nanostructures having a second shape distribution, a first sensor configured to receive light reflected by an object that is irradiated by light emitted by the structured light projector, and a processor configured to obtain first information regarding a depth position of the object based on the light received by the first sensor.

The electronic device may further include a second sensor configured to receive the light reflected by the object, wherein the processor is further configured to obtain second information regarding the depth position of the object based on the light received by the second sensor.

The processor may be further configured to obtain depth information of the object based on at least one of the first information and the second information.

According to yet another aspect of an example embodiment, there is provided a structured light projector including a light source configured to emit light, the light source including a plurality of light-emitting elements, and a nanostructure array configured to form a dot pattern based on the light emitted by the light source and including a plurality of super cells, each of the plurality of super cells including a plurality of sub cells, wherein each of the plurality of sub cells is configured to modulate a phase of light emitted by the light source based on a phase profile of each of the plurality of sub cells.

The phase profile of each of the plurality of sub cells may be set based on a predetermined rule corresponding to the dot pattern.

The plurality of light-emitting elements and the plurality of super cells may be provided in two-dimensional periodic lattices, respectively, and the two-dimensional periodic lattices of the plurality of light-emitting elements and the two-dimensional periodic lattices of the plurality of super cells may have a same shape.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
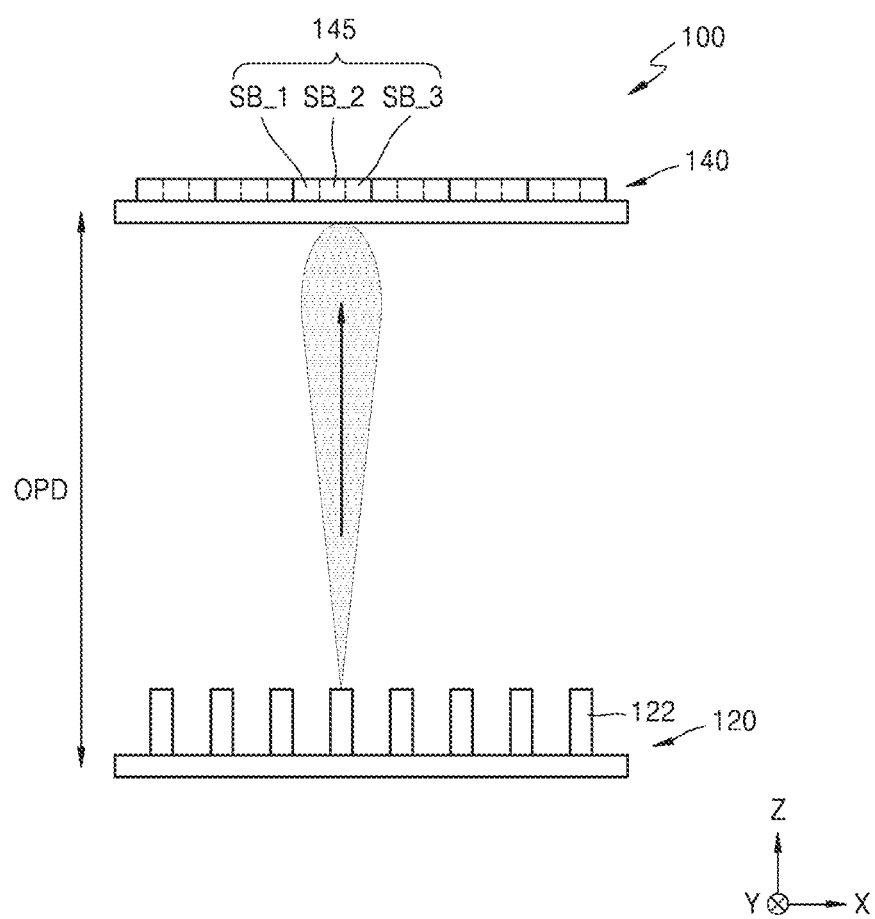
FIG. 1 is a cross-sectional view illustrating a structure of a structured light projector according to an example embodiment.

Reference will now be made in detail to example embodiments of which are illustrated in the accompanying drawings, wherein like reference numerals refer to like elements throughout, and each element may be exaggerated in size for clarity and convenience of a description. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

The following example embodiments are merely illustrative, and various modifications may be possible from the embodiments.

An expression such as "above" or "on" may include not only the meaning of "immediately on in a contact manner", but also the meaning of "on in a non-contact manner".

When it is assumed that a certain part includes a certain component, the term "including" or "comprising" means that a corresponding component may further include other components unless a specific meaning opposed to the corresponding component is written.

The term used in the embodiments such as "unit" or "module" indicates a unit for processing at least one function or operation, and may be implemented in hardware, software, or in a combination of hardware and software.

Figure 2:
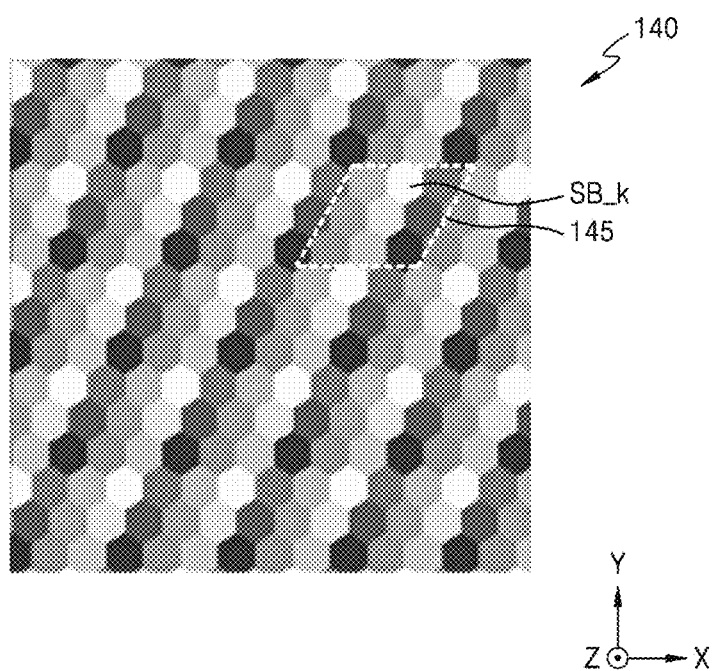
FIG. 2 is a plan view showing that a pattern of a nanostructure array included in a structured light projector of FIG. 1 that includes super cells including a plurality of sub cells.
Figure 3:
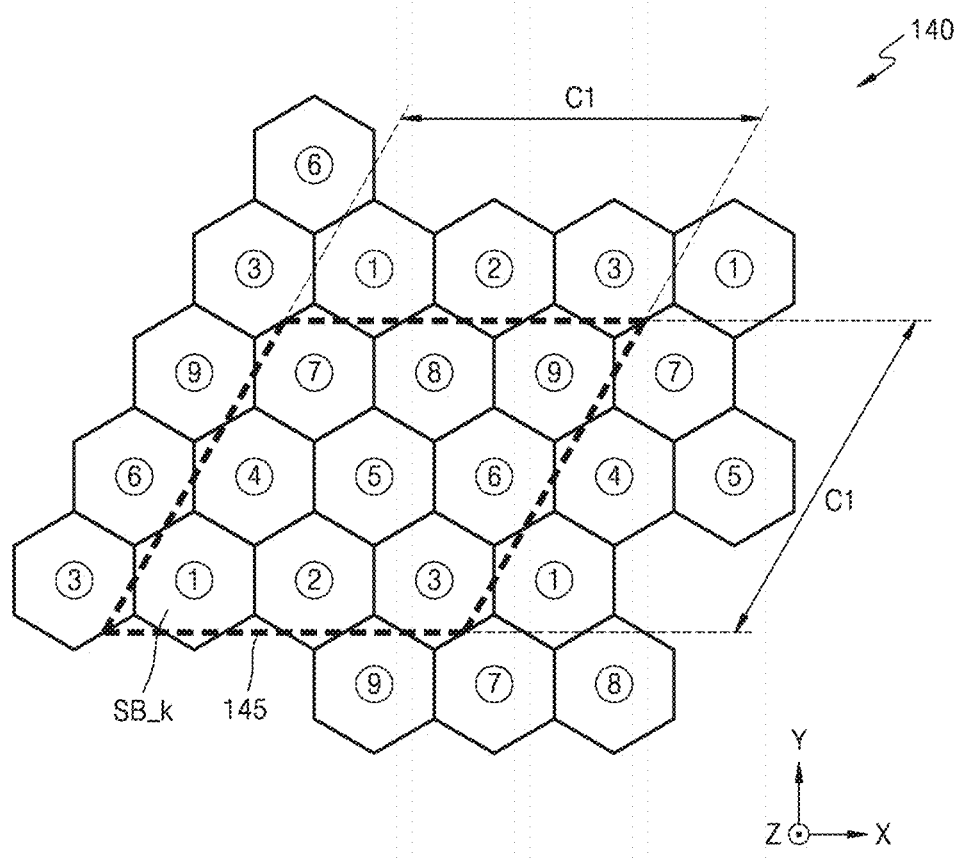
FIG. 3 is a plan view showing in detail a pattern including sub cells and super cells of a nanostructure array by enlarging a partial region of FIG. 2.
Figure 4:
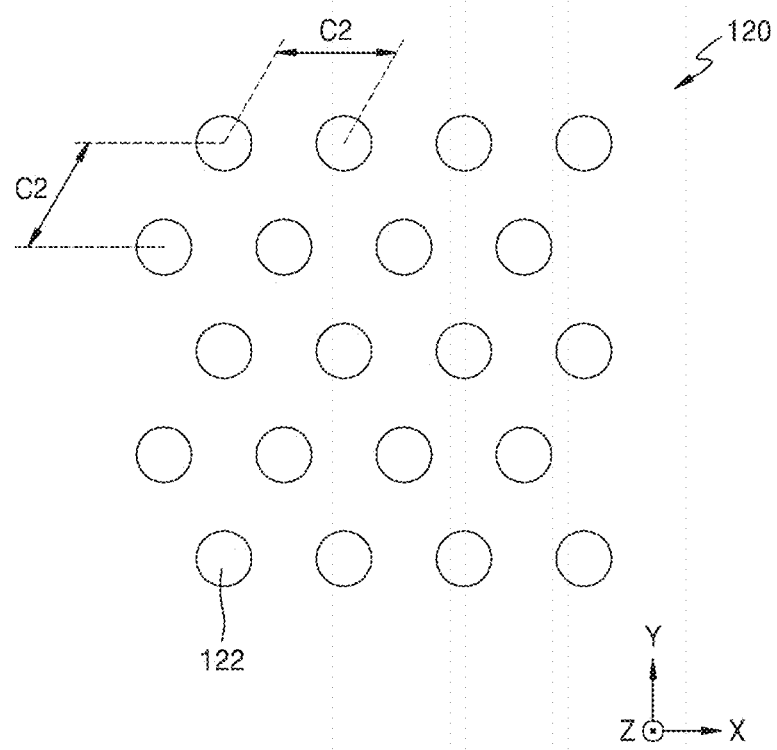
FIG. 4 is a plan view illustrating arrangement of a plurality of light-emitting elements included in a light source included in a structured light projector of FIG. 1.

FIG. 1 is a cross-sectional view illustrating a structure of a structured light projector according to an example embodiment. FIG. 2 is a plan view showing that a pattern of a nanostructure array included in the structured light projector of FIG. 1 that includes super cells including a plurality of sub cells, and FIG. 3 is a plane view showing a pattern including sub cells and super cells of the nanostructure array by enlarging a partial region of FIG. 2. FIG. 4 is a plan view illustrating arrangement of a plurality of light-emitting elements included in a light source included in the structured light projector of FIG. 1.

A structured light projector 100 may include a light source 120 and a nanostructure array 140 that forms structured light having a dot pattern by light emitted from the light source 120.

The nanostructure array 140 may include a plurality of nanostructures. Arrangement of the plurality of nanostructures may form a hierarchical structure of nanostructure-subcell-supercell. For example, a sub cell includes a plurality of nanostructures, and a plurality of sub cells form a super cell. The super cell 145 is repetitively arranged on the nanostructure array 140.

Referring to FIG. 3, the super cell 145 may include $k^{th}$ sub cell SB_k (where k is an integer from 1 to 9). However, the number of sub cells, 9, is merely an example, and embodiments are not limited thereto. The number of sub cells may be an integer greater than or equal to 2. The $k^{th}$ sub cell SB_k (k is an integer from 1 to 9) may be indicated by ⓚ. The super cell 145 including the k sub cells SB_k (k is an integer from 1 to 9) may be arranged in a two-dimensional (2D) periodic lattice form. As shown in FIG. 3, the periodic lattice may be a parallelogram shape in which lattice constants in two directions are equal to C1.

The light source 120 may include an array of a plurality of light-emitting elements 122. However, embodiments are not limited thereto, and the light source 120 may be a single light source.

When the light source 120 includes the array of the plurality of light-emitting elements 122, arrangement of the plurality of light-emitting elements 122 may be identical or similar to arrangement of the super cell 145. When a plurality of super cells 145 are arranged in a 2D periodic lattice form, the plurality of light-emitting elements 122 may also be arranged in a corresponding 2D periodic lattice form. For example, the plurality of super cells 145 and the plurality of light-emitting elements 122 may be arranged in the 2D periodic lattices of the same shape or similar shapes. The plurality of light-emitting elements 122 and the plurality of super cells 145 may be arranged in the 2D periodic lattices having the same shape and the same size. The plurality of light-emitting elements 122 and the plurality of super cells 145 may also be arranged in the 2D periodic lattices having the same shape and different sizes. However, embodiments are not limited thereto. An optimal optical distance between the nanostructure array 140 and the light source 120 may be determined based on an arrangement pitch between each of the plurality of light-emitting elements 122. The plurality of light-emitting elements 122 and the plurality of super cells 145 may be arranged in the 2D periodic lattices having different shapes and different sizes.

The light-emitting element 122 may be a light-emitting diode (LED) or a laser diode. The light-emitting element 122 may be a vertical cavity surface emitting laser (VCSEL). The light-emitting element 122 may include an active layer including a Group III-V semiconductor material or a Group II-VI semiconductor material and having a multi-quantum well structure. However, embodiments are not limited thereto. The light-emitting element 122 may emit laser light of about 850 nm or 940 nm, or light in a near infrared light or visible light wavelength band. However, the wavelength of the light emitted from the light-emitting element 122 is not limited thereto, and the light-emitting element 122 emitting light in a desired wavelength band may be used.

The light-emitting elements 122 may be separately controlled. Optical characteristics, for example, a wavelength, an angular spectrum of a wave front, etc., of the light-emitting elements 122 may be identical. However, embodiments are not limited thereto, and the light-emitting elements 122 having different optical characteristics may be employed together.

As illustrated in FIG. 4, the plurality of light-emitting elements 122 may be arranged in a parallelogram form, in which the lattice constants in the two directions are C2. The sizes of periodic lattices, i.e., the lattice constants in the two directions of arrangement of the plurality of super cells 145 and arrangement of the plurality of light-emitting elements 122 may not be the same as each other. A ratio of the lattice constant C1 for arrangement of the plurality of super cells 145 to the lattice constant C2 for arrangement of the plurality of light-emitting elements 122 may be a rational value. For example, C1/C2 is not limited to an integer, and may have an arbitrary rational value. Arrangement of the plurality of light-emitting elements 122 may have a relation in which one or more light-emitting elements 122 correspond to one super cell 145. However, embodiments are not limited thereto, and the number of light-emitting elements 122 may be less than the number of super cells 145.

The plurality of sub cells SB_k (k is an integer from 1 to 9) may have an equal area, respectively. Each sub cell SB_k (k is an integer from 1 to 9) may have an area obtained by equally dividing the area of the super cell 145. The super cell 145 and the sub cell SB_k (k is an integer from 1 to 9) may have the same shape. Although the sub cell SB_k (k is an integer from 1 to 9) is illustrated as a regular hexagon and the super cell 145 is illustrated as a parallelogram in FIG. 3, this illustration is an example and the sub cell SB_k (k is an integer from 1 to 9) may also have a parallelogram shape. The uniformity in intensity between dots of a dot pattern of structured light may be maximized by equalizing the areas of the sub cells SB_k (k is an integer from 1 to 9). However, embodiments are not limited thereto, and area distribution between the sub cells SB_k (k is an integer from 1 to 9) in the super cell 145 may not be uniform. The plurality of sub cells SB_k (k is an integer from 1 to 9) may have different areas, respectively. The plurality of sub cells SB_k (k is an integer from 1 to 9) may have different shapes, respectively. The super cell 145 and the sub cell SB_k (k is an integer from 1 to 9) may have different shapes. The shapes may be determined considering a structured light pattern required based on an application to which the structured light projector 100 is to be applied.

An optical distance OPD between the light source 120 and the nanostructure array 140 may be determined to be a proper distance in which when light from the light source 120 forms a dot pattern while passing through the nanostructure array 140, each dot is clearly formed. For example, the optical distance OPD may be set to a distance in which a clear dot is formed by self-imaging, Talbot effect, etc.

When the plurality of light-emitting elements 122 and the plurality of super cells 145 are arranged in the 2D periodic lattices having the same shape and the same size, the optical distance OPD may be an integer multiple of $C^2/2\lambda$ for a lattice constant C of the super cell 145, a central wavelength $\lambda$ of light from the light source 120, and a refractive index 1 of a medium between the light source 120 and the nanostructure array 140.

Figure 5:
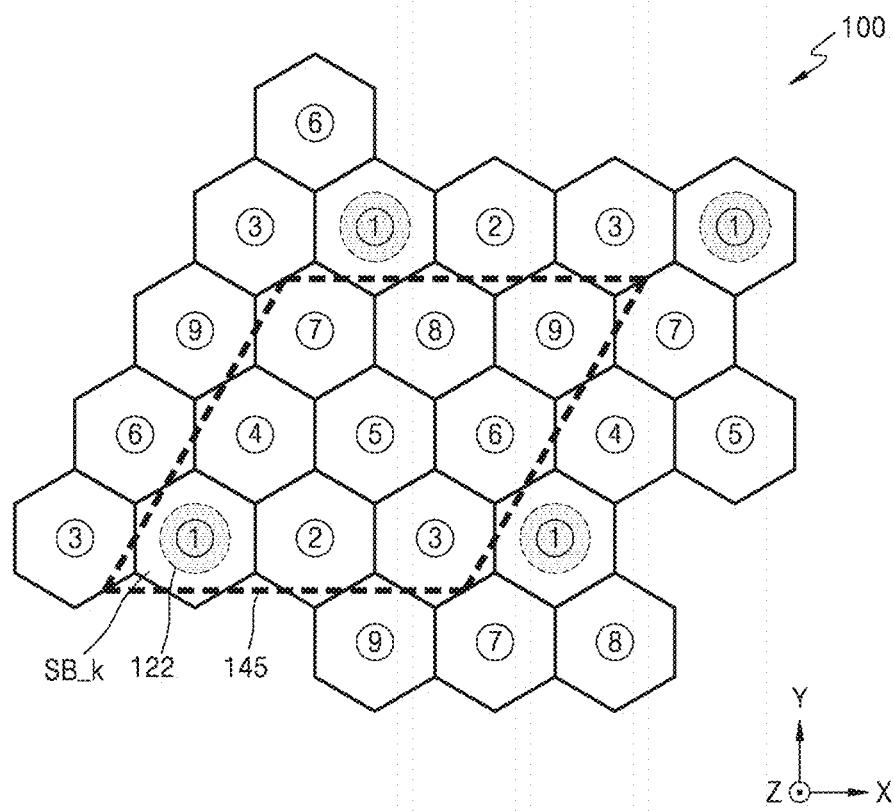
FIG. 5 is a plan view enlarging a partial region of a structured light projector of FIG. 1, which illustrates a corresponding relation between a super cell and a light-emitting element.

FIG. 5 is a plan view enlarging a partial region of the structured light projector 100 of FIG. 1, illustrating a corresponding relation between the super cell 145 and the light-emitting element 122.

As shown in FIG. 5, one light-emitting element 122 may correspond to one super cell 145. A position in which one light-emitting element 122 corresponds to one super cell 145 is not limited to an illustrated position ①. As long as arrangement of the light-emitting elements 122 has a periodic lattice form having the same shape as that of arrangement of the super cells 145, the light-emitting element 122 and the super cell 145 may correspond to each other in another position in the super cell 145.

Figure 6:
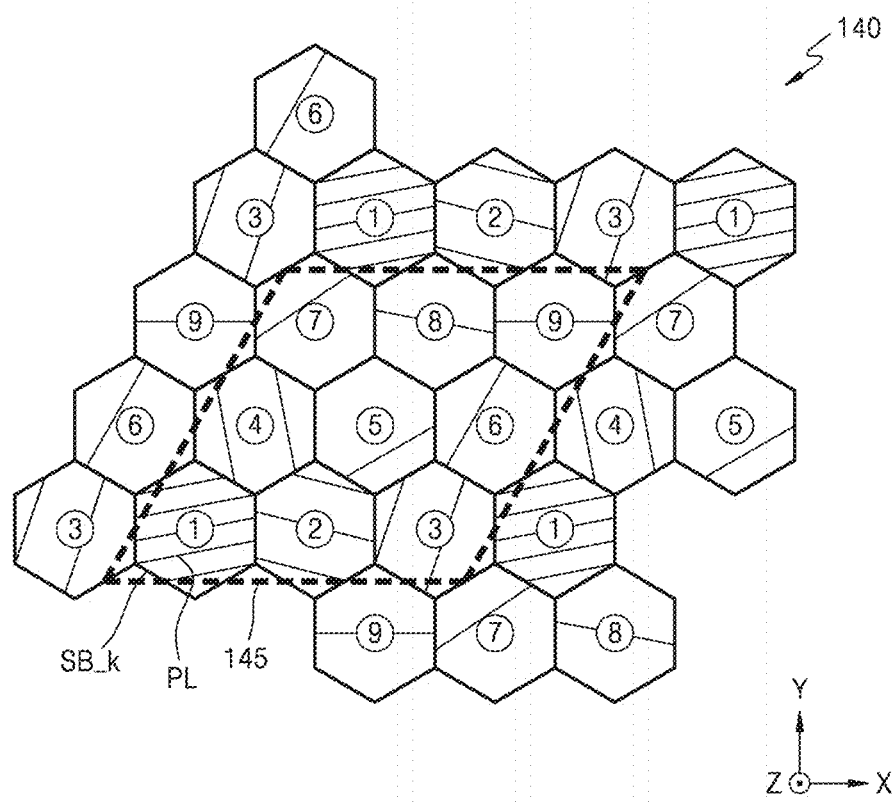
FIG. 6 conceptually shows that sub cells included in a super cell form different phase profiles.
Figure 7:
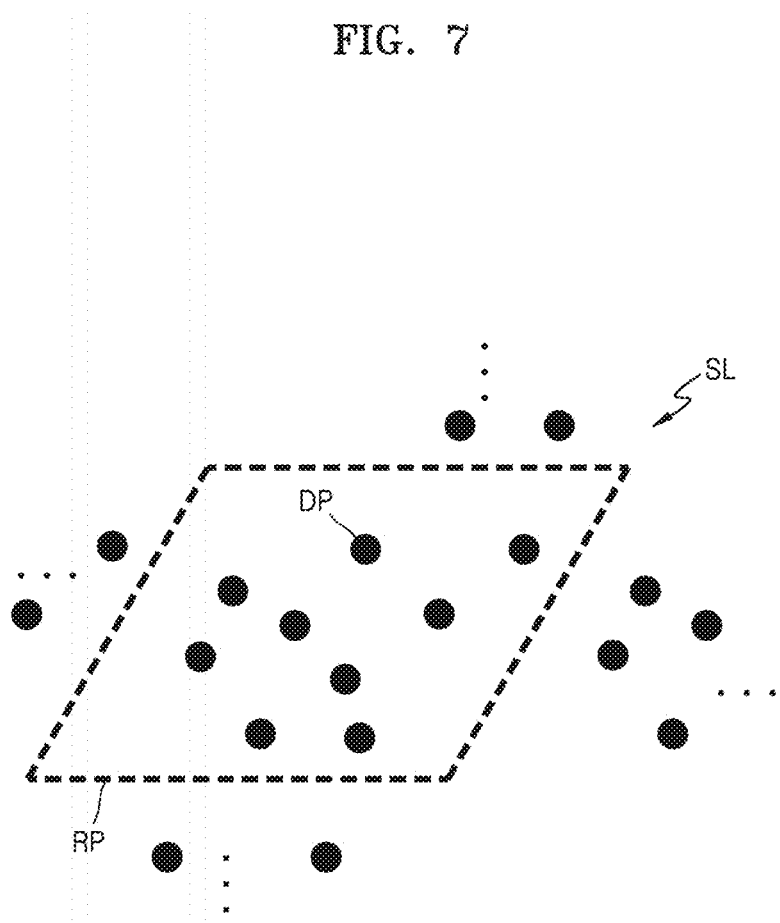
FIG. 7 illustrates a random pattern of structured light formed by a super cell.

FIG. 6 conceptually shows that sub cells included in a super cell forming different phase profiles, and FIG. 7 illustrates a random pattern of structured light formed by a super cell.

The $k^{th}$ sub cells SB_k (k is an integer from 1 to 9) included in the super cell 145 may have the same phase profile or different phase profiles for modulating a phase of incident light. Different phase profiles are illustrated using different slash lines PL in the sub cells SB_k. Phase profiles of the k sub cells SB_k (k is an integer from 1 to 9) may be associated with each other according to a rule depending on a dot pattern to be formed. For example, when the k sub cells SB_k (k is an integer from 1 to 9) share the same lens phase profile, structured light in a periodic dot pattern may be formed.

The phase profiles of the k sub cells SB_k (k is an integer from 1 to 9) may include a local phase profile component that is common among the k sub cells SB_k (k is an integer from 1 to 9) and a global phase profile component associated with a relative position of the super cell 145 in which the $k^{th}$ sub cell SB_k is included. The local phase profile may be a phase profile having center of each $k^{th}$ sub cell SB_k (k is an integer from 1 to 9) a reference thereof. The global phase profile associated with the relative position of the super cell 145 in which the $k^{th}$ sub cell SB_k (k is an integer from 1 to 9) is included is associated with a 2D coordinate space position of the super cell 145 in which the $k^{th}$ sub cell SB_k (k is an integer from 1 to 9) is included. For example, letting an interval between the diagonal lines PL be a period of a global linear phase profile, the global phase profile is determined based on wavevectors ($k_x$, $k_y$) corresponding thereto and position coordinates (x, y) on a 2D space on which nanostructures of a nanostructure array are arranged. A phase difference between the k sub cells of different super cells is determined based on a relative position of the super cell and a wavevector corresponding to the $k^{th}$ sub cell SB_k. Different sub cells may have different wavevectors.

The local phase profile may determine an intensity distribution of a dot pattern, light spread, etc. The global phase profile may shift a position of the dot pattern to be formed by the local phase profile. An amount and a direction of the shift may correspond to a size and a direction of a wavevector of the global linear phase profile.

Referring to FIG. 7, structured light SL may include a plurality of repeated random patterns RP. The illustrated random pattern RP illustrates the dot pattern formed by one super cell 145. A unique wavevector set of the $k^{th}$ sub cell SB_k (k is an integer from 1 to 9) may be set such that positions of dots of the structured light SL do not overlap. The position, intensity distribution, size, etc., of the dot may be changed for a desired form by designing phase profiles of the k sub cells SB_k (k is an integer from 1 to 9).

Figure 8:
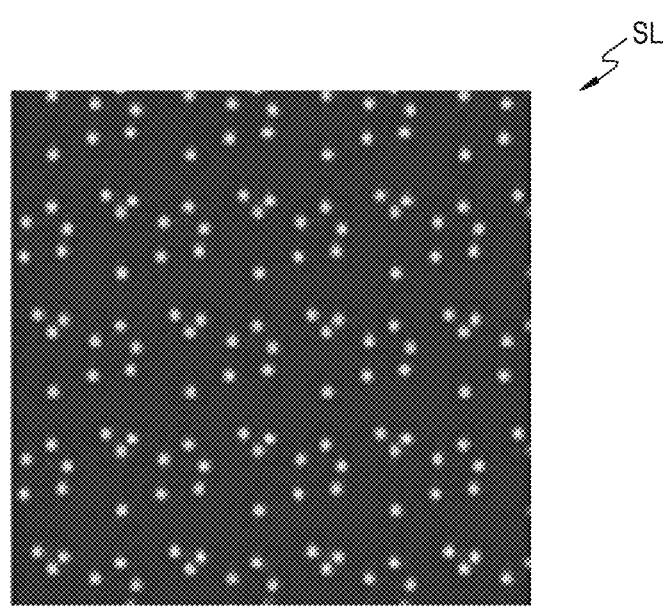
FIG. 8 illustrates structured light in a quasi-random dot pattern formed by a structured light projector of FIG. 1.

FIG. 8 illustrates structured light in a quasi-random dot pattern formed by a structured light projector of FIG. 1.

Herein, the quasi-random dot pattern indicates a pattern in which each random pattern including a plurality of dots forms a cluster that is arranged according to a rule.

Figure 9:
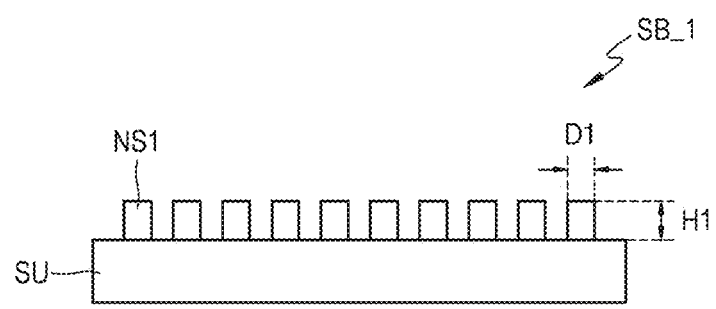
FIG. 9 is a cross-sectional view showing in detail a first sub cell included in a nanostructure array of a structured light projector of FIG. 1.
Figure 10:
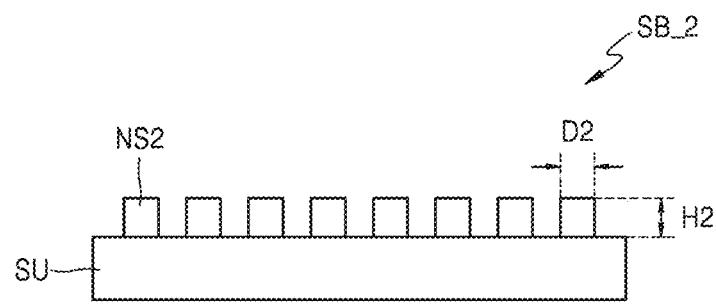
FIG. 10 is a cross-sectional view showing in detail a second sub cell included in a nanostructure array of a structured light projector of FIG. 1.

FIG. 9 is a cross-sectional view showing in detail a first sub cell included in a nanostructure array of a structured light projector of FIG. 1, and FIG. 10 is a cross-sectional view showing in detail a second sub cell included in a nanostructure array of a structured light projector of FIG. 1.

FIGS. 11A through 11E are perspective views showing in detail example shapes of a nanostructure shown in FIGS. 9 and 10.

A first sub cell SB_1 may include a substrate SU and a plurality of first nanostructures NS1 formed on the substrate SU. The first nanostructure NS1 may have a column shape having a cross-sectional width D1 and a height H1. The first nanostructure NS1 may have a shape dimension of a sub wavelength, i.e., a shape dimension less that a central wavelength λ of light emitting by the light source 120. The height H1 of the first nanostructure NS1 may be less than or equal to ⅔ of the wavelength A. An arrangement pitch of the plurality of first nanostructures NS1 may be less than or equal to ½ of the wavelength λ.

A second sub cell SB_2 may include the substrate SU and a plurality of second nanostructures NS2 formed on the substrate SU. The second nanostructure NS2 may have a column shape having a cross-sectional width D2 and a height H2. The height H2 of the second nanostructure NS2 may be less than or equal to ⅔ of the wavelength λ. An arrangement pitch of the plurality of first nanostructures NS2 may be less than or equal to ½ of the wavelength λ.

A shape distribution of the plurality of first nanostructures NS1 and a shape distribution of the plurality of second nanostructures NS2 may be different from each other. Herein, shape distribution may be any one or more of a shape, a size, an arrangement pitch, shape distribution for each position, size distribution for each position, and arrangement pitch distribution for each position, with respect to each of the first nanostructure NS1 and the second nanostructure NS2. The shape distribution of the plurality of first nanostructures NS1 and the shape distribution of the plurality of second nanostructures NS2 may be determined in a dot pattern to be formed by a super cell including the first sub cell SB_1 and the second sub cell 562.

FIGS. 9 and 10 illustrate two sub cells, i.e., the first sub cell SB_1 and the second sub cell SB_2. For a super cell including N sub cells, first through $N^{th}$ shape distributions of a plurality of first nanostructures through a plurality of $N^{th}$ nanostructures included in the first through Nth sub cells, respectively, may be different from one another. According to an example embodiment, nanostructure shape distributions of at least two sub cells may be different from one another.

As such, a plurality of sub cells forming a super cell may have phase profiles that are associated with each other according to a rule depending on a dot pattern to be formed by the super cell. Nanostructure shape distribution of each sub cell is determined to implement such a phase profile. Although each of the plurality of first nanostructures NS1 and each of the plurality of second nanostructures NS2 are illustrated as having the same shape, size, and interval, respectively, example embodiments are not limited thereto. When a super cell includes N sub cells, the $k^{th}$ nanostructure shape distribution of the $k^{th}$ sub cell SB_k (k is an integer from 1 to 9) may be determined to implement a desired phase profile.

The first nanostructure NS1 and the second nanostructure NS2 may include a material having a refractive index that is different from a refractive index of a surrounding material by 0.5 or more. For example, the substrate SU supporting the first nanostructure NS1 and the substrate SU supporting the second nanostructure NS2 may include a material having a refractive index that is different from a refractive index of the first nanostructure NS1 and a refractive index of the second nanostructure NS2. A difference between the refractive indices of the substrate SU and the first nanostructure NS1 and a difference between the refractive indices of the substrate SU and the second nanostructure NS2 may be greater than or equal to 0.5. The refractive indices of the first nanostructure NS1 and the second nanostructure NS2 may be higher than the refractive index of the substrate SU, but example embodiments are not limited thereto. For example, the refractive indices of the first nanostructure NS1 and the second nanostructure NS2 may be lower than the refractive index of the substrate SU.

The substrate SU may include any one material among glass (fused silica, BK7, etc.), quartz, polymer (polymethyl methacrylate (PMMA), SU-8, etc.), and plastic, or may be a semiconductor substrate. The first nanostructure NS1 and the second nanostructure NS2 may include at least one of c-Si, p-Si, a-Si, Group III-V compound semiconductor (gallium phosphide (GaP), gallium nitride (GaN), gallium arsenide (GaAs), etc.), silicon carbide (SiC), titanium oxide (TiO2), or silicon nitride (SiN).

Figure 11A:
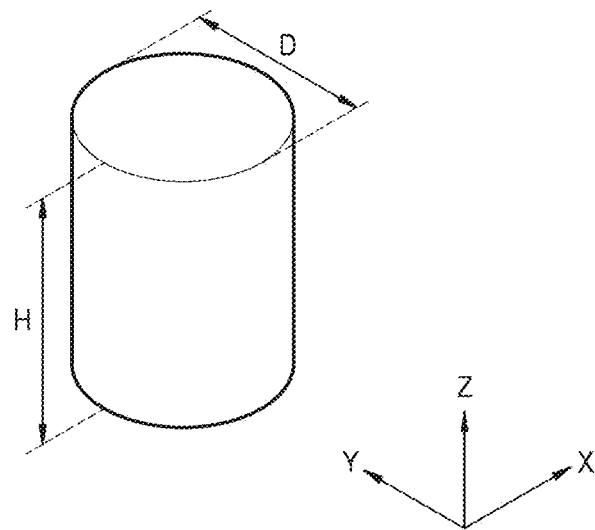
FIGS. 11A through 11E are perspective views showing example shapes of a nanostructure shown in FIGS. 9 and 10.
Figure 11B:
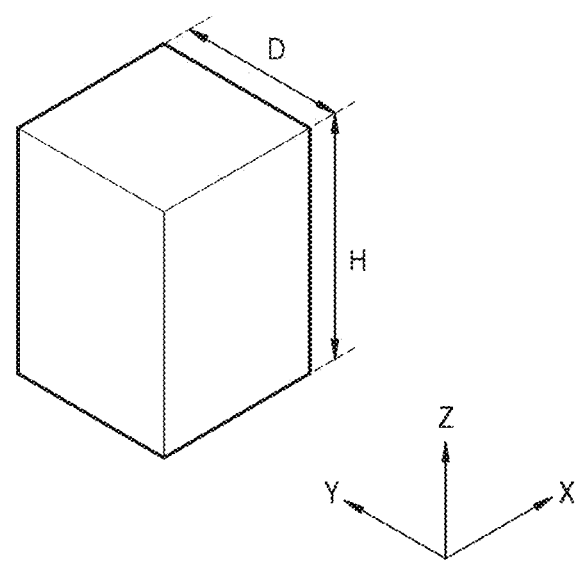
Figure 11C:
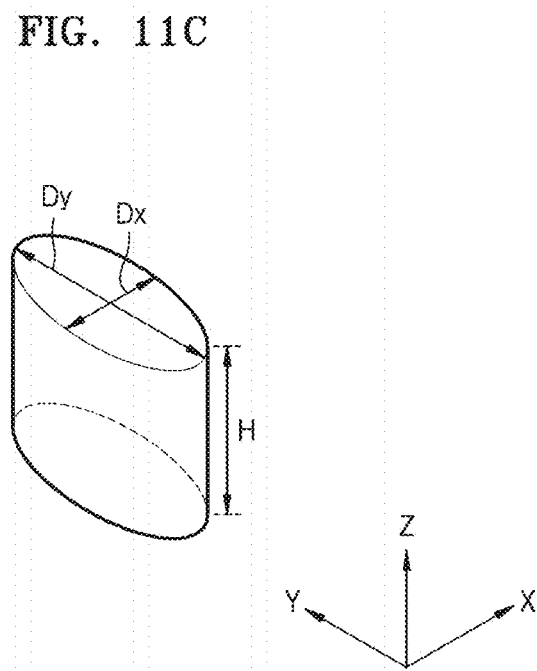
Figure 11D:
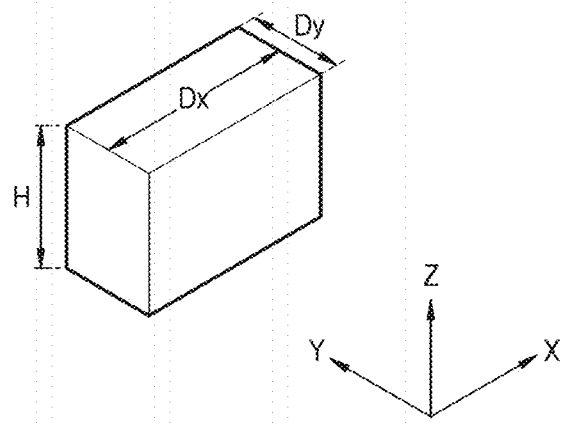
Figure 11E:
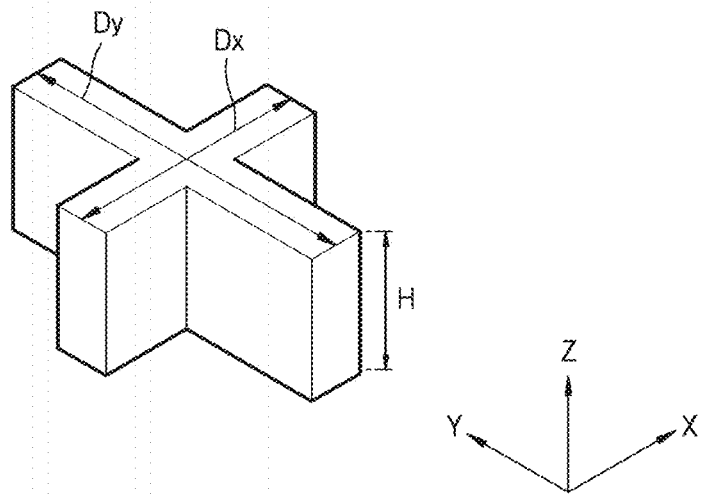

The first nanostructure NS1 and the second nanostructure NS2 may have a cylindrical shape with a diameter D and the height H as illustrated in FIG. 11A, or a square prism shape with a side length D and the height H as illustrated in FIG. 11B. The first nanostructure NS1 and the second nanostructure NS2 may have a column shape having an asymmetric cross section. The first nanostructure NS1 and the second nanostructure NS2 may have an elliptic column shape having different lengths of a major axis Dx and a minor axis Dy and the height H as illustrated in FIG. 11C, have a rectangular prism shape having different lengths of a width Dx and a length Dy and the height H as illustrated in FIG. 11D, and a prism shape having a cross-shape cross section with different lengths of the width Dx and the length Dy and the height H as illustrated in FIG. 11E.

Figure 12:
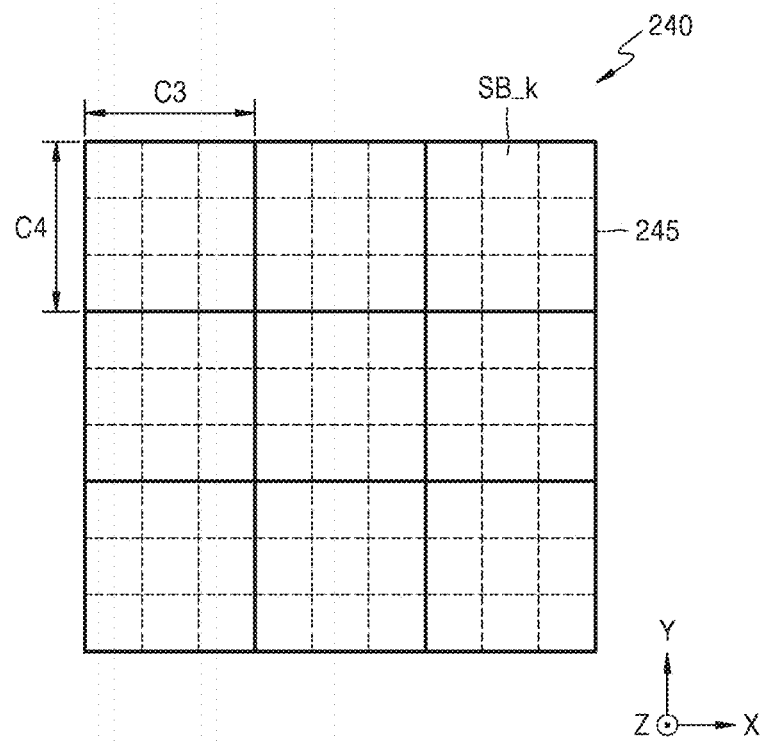
FIG. 12 is a plan view showing a pattern of a nanostructure array included in a structured light projector according to an example embodiment.

FIG. 12 is a plan view showing a pattern of a nanostructure array included in a structured light projector according to an example embodiment.

A plurality of super cells 245 of a nanostructure array 240 may be arranged in a periodic lattice form having a rectangular shape. A lattice constant C3 in a horizontal direction X and a lattice constant C4 in a vertical direction Y may be equal to or different from each other. Sub cells SB_k (k is an integer from 1 to 9) included in the super cell 245 may be arranged in a periodic lattice form having a rectangular shape. The super cell 245 is illustrated as including nine sub cells SB_k, but this is merely an example, such that two or more or another number of sub cells may be included therein.

Figure 13:
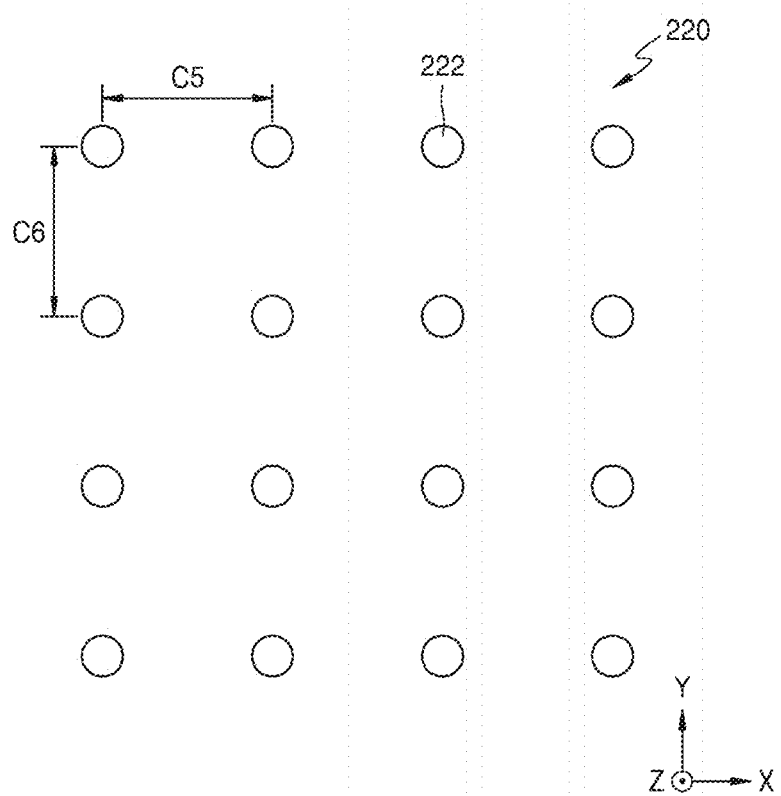
FIG. 13 is a plan view showing arrangement of a plurality of light-emitting elements included in a light source employed in a structured light projector including a nanostructure array of FIG. 12.

FIG. 13 is a plan view showing arrangement of a plurality of light-emitting elements included in a light source employed in a structured light projector including a nanostructure array of FIG. 12.

When a light source 220 includes a plurality of light-emitting elements 222 in a structured light projector including the nanostructure array 240 as illustrated in FIG. 12, the plurality of light-emitting elements 222 may be arranged in a periodic lattice form having a rectangular shape like the super cells 245 of the nanostructure array 240. A lattice constant in the horizontal direction X and a lattice constant in the vertical direction Y for arrangement of the plurality of light-emitting elements 222 may be C5 and C6, respectively.

When arrangement of the super cells 245 of the nanostructure array 240 is in a square lattice form in which C3 and C4 are equal to each other, arrangement of the plurality of light-emitting elements 122 may also be in a square lattice form in which C5 and C6 are equal to each other. C3/C4 may be equal to C5/C6. One or more light-emitting elements 222 may correspond to one super cell 245, that is, the number of plural light-emitting elements may be equal to or greater than the number of super cells 245. However, example embodiments are not limited thereto, and the number of plural light-emitting elements 222 may be less than the number of super cells 245.

Figure 14:
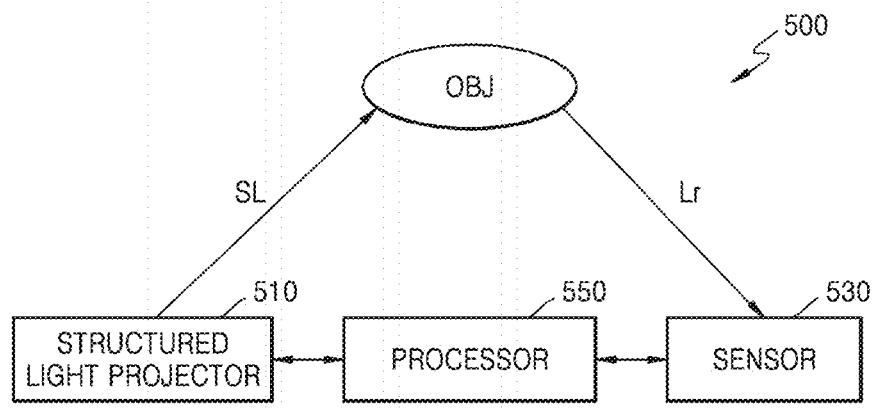
FIG. 14 is a block diagram illustrating a schematic structure of an electronic device according to an example embodiment.

FIG. 14 is a block diagram illustrating a structure of an electronic device according to an example embodiment.

An electronic device 500 may include a structured light projector 510 configured to radiate structured light SL to an object OBJ, a sensor 530 configured to receive the light reflected from the object OBJ that is irradiated with structured light SL, and a processor 550 configured to perform calculation for obtaining shape information of the object OBJ from light Lr received from the sensor 530.

The structured light projector 510 may employ the above-described structured light projector 100. The structured light projector 510 may form structured light in a desired dot pattern by using a shape of a hierarchical structure formed of a nanostructure-sub cell-super cell of a nanostructure array and a light source having arrangement corresponding thereto, thus forming structured light in a desired dot pattern. In this hierarchical structure, the number of plural sub cells included in a super cell or a relationship between phase profiles of the sub cells may depend on an application in which information about the object OBJ is used.

The sensor 530 may sense the structured light Lr reflected by the object OBJ. The sensor 530 may include an array of optical detection elements. The sensor 530 may further include a spectroscopy device for analyzing light reflected from the object OBJ based on a wavelength.

The processor 550 may obtain depth information regarding the object OBJ by comparing the structured light SL irradiated to the object OBJ with the light Lr reflected from the object OBJ, and analyze 3D shape, position, movement, etc., of the object OBJ from the obtained depth information. A dot pattern of the structured light SL generated in the structured light projector 510 may be a mathematically coded pattern to uniquely have an angle and a direction of rays of light and position coordinates of a bright point and a dark point reaching a focal plane. This pattern may be formed by a detailed shape of the hierarchical structure in which nanostructures included in the structured light projector 510 form sub cells and super cells. When light in this pattern is reflected from the object OBJ in a 3D shape, a pattern of the reflected light Lr has a shape changed from the pattern of the irradiated structured light SL. Such patterns may be compared and a coordinate-specific pattern may be tracked to extract the depth information of the object OBJ, such that 3D information associated with shape, depth, and movement of the object OBJ may be extracted.

The processor 550 may control an operation of the electronic device 500 overall, for example, an operation of the sensor 530 or driving of a light source included in the structured light projector 510.

The electronic device 500 may further include a memory. A calculation module programmed to allow the processor 550 to execute calculation for extraction of 3D information regarding the object OBJ, and other data necessary for the calculation may be stored in the memory.

Optical elements for adjusting a direction of the structured light SL from the structured light projector 510 toward the object OBJ or performing further modulation with respect to the structured light SL may be further arranged between the structured light projector 510 and the object OBJ.

A calculation result of the processor 550, i.e., information about the shape and the position of the object OBJ may be transmitted to another unit or another electronic device. For example, such information may be used in another application module stored in the memory may be used. The other electronic device to which the calculation result is transmitted may be a display device or a printer. The other electronic device may also be, but not limited to, an autonomous device such as an unmanned vehicle, an autonomous vehicle, a robot, a drone, etc., a smart phone, a smart watch, a cellular phone, a personal digital assistant (PDA), a laptop, a personal computer (PC), various wearable devices, other mobile or non-mobile computing devices, Internet of Things (IoT) devices, or the like.

The electronic device 500 may be a depth camera or a structured light camera that obtains a depth image of the object OBJ. The electronic device 500 may also be, but is not limited to, an autonomous device such as an unmanned vehicle, an autonomous vehicle, a robot, a drone, etc., a smart phone, a smart watch, a cellular phone, a PDA, a laptop, a PC, various wearable devices, other mobile or non-mobile computing devices, IoT devices, or the like, which uses the depth information of the object OBJ.

Figure 15:
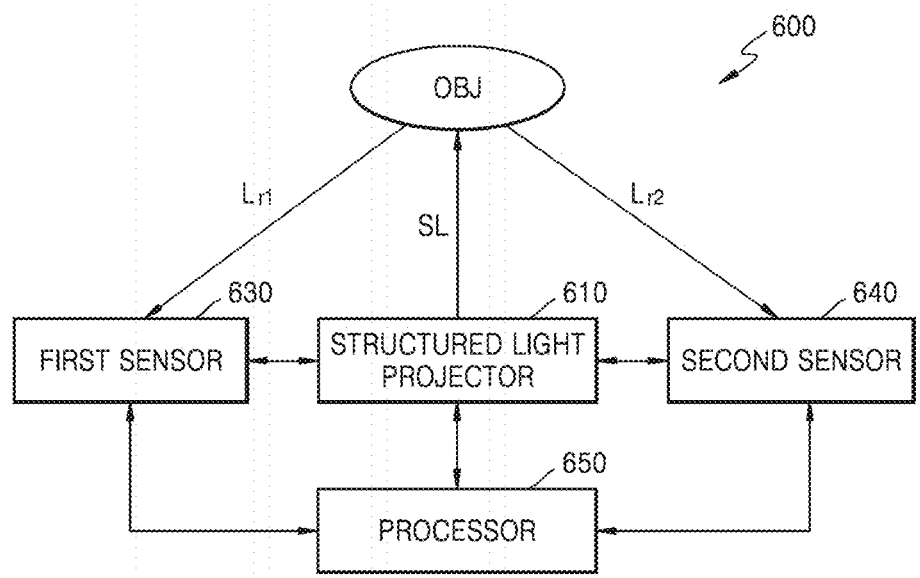
FIG. 15 is a block diagram illustrating a structure of an electronic device according to an example embodiment.

FIG. 15 is a block diagram illustrating a schematic structure of an electronic device according to an example embodiment.

An electronic device 600 may include a structured light projector 610 configured to irradiate the structured light SL to the object OBJ, a first sensor 630 and a second sensor 640 configured to sense light from the object OBJ, and a processor 650 configured to perform calculation for obtaining shape information of the object OBJ by analyzing light received from at least one of the first sensor 630 or the second sensor 640.

The electronic device 600 according to the example embodiment is different from the electronic device 500 of FIG. 14 in that the electronic device 600 includes the first sensor 630 and the second sensor 640 that are arranged in different positions to receive light reflected from the object OBJ. Information at different viewpoints, associated with depth positions, may be obtained by the first sensor 630 and the second sensor 640 arranged in different positions with respect to the object OBJ. The processor 650 may calculate depth information by using information at a plurality of viewpoints, thus having improved accuracy.

The electronic device 600 may be referred to as an active stereo camera in that the information at the plurality of viewpoints are obtained by using structured light rather than general lighting.

The first sensor 630, the structured light projector 610, and the second sensor 640 may be arranged in series or arranged spaced apart by a certain distance. Although the structured light projector 610 is illustrated as being arranged between the first sensor 630 and the second sensor 640, this illustration is an example. The first sensor 630 may be arranged between the second sensor 640 and the structured light projector 610 or may be arranged differently.

The first sensor 630 and the second sensor 640 each may include an array of optical detection elements. The first sensor 630 and the second sensor 640 may be arranged in different positions relative to the structured light projector 610, and thus may have different detailed information of reflected light sensed from the object OBJ. The first sensor 630 may receive reflected light $L_{r1}$, and the second sensor 640 may receive reflected light $L_{r2}$.

The processor 650 may calculate first information regarding a depth position of the object OBJ by analyzing the reflected light $L_{r1}$ received from the first sensor 630, and calculate second information regarding a depth position of the object OBJ by analyzing the reflected light $L_{r2}$ received from the second sensor 640. The processor 650 may calculate depth information regarding the object OBJ by using any one or all of the first information and the second information.

The electronic device 600 according to the example embodiment may improve accuracy when compared to the example embodiment including one sensor. The electronic device 600 may obtain image information at plural viewpoints for the object OBJ by the first sensor 630 and the second sensor 640 in two different positions, thus obtaining the depth information regarding the object OBJ by using various methods depending on a use environment. The electronic device 600 may obtain the depth information regarding the object OBJ by selectively using, for example, structured light or ambient light. That is, image information at a plurality of viewpoints for the object OBJ may be obtained by turning off the structured light projector 610 and using the ambient light, or by combining image information using the ambient light with image information using the structured light.

The above-described structured light projector may provide structured light in a dot pattern suitable for an application requiring the structured light.

The above-described structured light projector may minimize a device size and improve optical efficiency by using an array of subwavelength nanostructures.

The electronic device employing the above-described structured light projector may obtain depth information having improved accuracy for an object.

Particular executions described in the example embodiments are merely examples, and do not limit a technical range with any method. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements.

It should be understood that example embodiments described herein should be considered in a descriptive sense only and not for purposes of limitation. Descriptions of features or aspects within each embodiment should typically be considered as available for other similar features or aspects in other embodiments.

While example embodiments have been described with reference to the figures, it will be understood by those of ordinary skill in the art that various changes in form and details may be made therein without departing from the spirit and scope as defined by the following claims.

What is claimed is:

1. A structured light projector comprising:
   a light source configured to emit light; and
   a nanostructure array configured to form a dot pattern based on the light emitted by the light source, the nanostructure array comprising a plurality of super cells, and each of the plurality of super cells comprising a plurality of nanostructures,
   wherein each of the plurality of super cells comprises a first sub cell that comprises a plurality of first nanostructures having a first shape distribution and a second sub cell that comprises a plurality of second nanostructures having a second shape distribution, and
   wherein the first sub cell and the second sub cell are sub-divided areas of each of the plurality of super cells that are different from each other.

2. The structured light projector of claim 1, wherein the light source comprises a plurality of light-emitting elements.

3. The structured light projector of claim 2, wherein the plurality of light-emitting elements and the plurality of super cells are provided in two-dimensional periodic lattices, respectively.

4. The structured light projector of claim 3, wherein a ratio of a lattice constant of the plurality of light-emitting elements to a lattice constant of the plurality of super cells is a rational number.

5. The structured light projector of claim 3, wherein the two-dimensional periodic lattices of the plurality of light-emitting elements and the two-dimensional periodic lattices of the plurality of super cells have a same shape and different sizes.

6. The structured light projector of claim 3, wherein the two-dimensional periodic lattices of the plurality of light-emitting elements and the two-dimensional periodic lattices of the plurality of super cells have a same shape and a same size.

7. The structured light projector of claim 6, wherein a distance between the light source and the nanostructure array is an integer multiple of $C^2/2\lambda$, in which C is a lattice constant of a super cell and $\lambda$ is a central wavelength of the light emitted by the light source.

8. The structured light projector of claim 1, wherein the first shape distribution and the second shape distribution are different from each other.

9. The structured light projector of claim 8, wherein the first sub cell and the second sub cell have equal areas.

10. The structured light projector of claim 1, wherein each super cell of the plurality of super cells further comprises kth sub cells respectively comprising a plurality of kth nanostructures having a kth shape distribution, in which k is an integer from 3 to N and N is an integer greater than 3.

11. The structured light projector of claim 10, wherein the first through Nth sub cells included in each super cell of the plurality of super cells are provided in a two dimensional periodic lattice.

12. The structured light projector of claim 11, wherein each of the first through Nth sub cells included in each super cell of the plurality of super cells has an area corresponding to an equally divided area of each super cell of the plurality of super cells.

13. The structured light projector of claim 10, wherein first through Nth shape distributions of the plurality of first nanostructures through a plurality of Nth nanostructures included in each of the first through Nth sub cells are different from each other.

14. The structured light projector of claim 10, wherein phase profiles of the first through Nth sub cells are associated with each other based on a predetermined rule, and
wherein each of the first through Nth sub cells is configured to modulate a phase of incident light based on the phase profiles of the first through Nth sub cells, respectively.

15. The structured light projector of claim 14, wherein a phase profile for an mth sub cell comprises a local phase profile that is common to the first through Nth sub cells and a global phase profile corresponding to a position of each super cell of the plurality of super cells in which the mth sub cell is included, in which m is an integer from 1 to N and N is an integer greater than or equal to 3.

16. The structured light projector of claim 1, wherein the plurality of first nanostructures and the plurality of second nanostructures, respectively, have shape dimensions that are less than a wavelength of the light emitted by the light source.

17. The structured light projector of claim 16, wherein a pitch of the plurality of first nanostructures and a pitch of the plurality of second nanostructures are less than or equal to ½ of the wavelength of the light emitted by the light source.

18. The structured light projector of claim 16, wherein a height of each first nanostructure and a height of each second nanostructure are less than or equal to ⅔ of the wavelength of the light emitted by the light source.

19. The structured light projector of claim 1, wherein each of the plurality of first nanostructures and each of the plurality of second nanostructures comprises a material having a refractive index that is different from a refractive index of a surrounding material by 0.5 or more.

20. The structured light projector of claim 1, wherein the dot pattern comprises a random pattern, and
wherein the random pattern comprises a plurality of dots forming a cluster that is regularly arranged.

21. An electronic device comprising:
a structured light projector comprising:
a light source configured to emit light; and
a nanostructure array configured to form a dot pattern based on the light emitted by the light source, the nanostructure array comprising a plurality of super cells, and each of the plurality of super cells comprising a plurality of nanostructures,
wherein each of the plurality of super cells comprises a first sub cell that comprises a plurality of first nanostructures having a first shape distribution and a second sub cell that comprises a plurality of second nanostructures having a second shape distribution, and
wherein the first sub cell and the second sub cell are sub-divided areas of each of the plurality of super cells that are different from each other;
a first sensor configured to receive light reflected by an object that is irradiated by the light emitted by the structured light projector; and
a processor configured to obtain first information regarding a depth position of the object based on the light received by the first sensor.

22. The electronic device of claim 21, further comprising:
a second sensor configured to receive the light reflected by the object,
wherein the processor is further configured to obtain second information regarding the depth position of the object based on the light received by the second sensor.

23. The electronic device of claim 22, wherein the processor is further configured to obtain depth information of the object based on at least one of the first information and the second information.

24. A structured light projector comprising:
a light source configured to emit light, the light source comprising a plurality of light-emitting elements; and
a nanostructure array configured to form a dot pattern based on the light emitted by the light source and comprising a plurality of super cells, each of the plurality of super cells comprising a plurality of sub cells,
wherein each of the plurality of super cells comprises a first sub cell that comprises a plurality of first nanostructures having a first shape distribution and a second sub cell that comprises a plurality of second nanostructures having a second shape distribution,
wherein each of the plurality of sub cells is configured to modulate a phase of light emitted by the light source based on a phase profile of each of the plurality of sub cells, and wherein the plurality of sub cells are sub-divided areas of each of the plurality of super cells that are different from each other.

25. The structured light projector of claim 24, wherein the phase profile of each of the plurality of sub cells are set based on a predetermined rule corresponding to the dot pattern.

26. The structured light projector of claim 24, wherein the plurality of light-emitting elements and the plurality of super cells are provided in two-dimensional periodic lattices, respectively, and wherein the two-dimensional periodic lattices of the plurality of light-emitting elements and the two-dimensional periodic lattices of the plurality of super cells have a same shape.

* * * * *